| United States Patent Office | 2,989,514 |
|---|---|
| | Patented June 20, 1961 |

2,989,514
NOVEL SULFUR CONTAINING POLYMERS AND THEIR PREPARATION

Rufus V. Jones, Bartlesville, Okla., assignor to Phillips Petroleum Company, a corporation of Delaware
No Drawing. Original application Feb. 25, 1954, Ser. No. 412,643, now Patent No. 2,860,123, dated Nov. 11, 1958. Divided and this application June 26, 1957, Ser. No. 668,048

6 Claims. (Cl. 260—79.3)

This application is a divisional application of Serial No. 412,643, filed February 25, 1954, now U. S. Patent 2,-860,123, which in turn is a continuation-in-part of my applications, Serial Nos. 123,795, 123,796, 123,797, filed October 26, 1949, now abandoned.

This invention relates to certain novel sulfur-containing polymers and to methods for preparing the same. In one of its aspects the invention relates to novel polymers, of an alkene sulfuric acid, having certain desirable properties and utilities. In another aspect of the invention, it relates to a novel moldable polymer of an alklene sulfuric acid and to the molded articles obtained therewith. In still a further aspect the invention is concerned with a useful solution of a polymer of an alkene sulfuric acid, for example, a film-forming solution useful for coating of materials. In a further aspect still, the invention relates to a solution of a relatively low molecular weight solid polymer of an alkene sulfuric acid useful as a polymeric emulsifier, for example, in acid-side polymerization to form resinous masses. Still further, in several of its aspects, the invention relates to the methods of preparing said polymers or polymer containing materials and to the several methods of their uses or applications, for example, the preparation of a polymer of the invention by simply heating an alkene sulfuric acid at a moderately elevated temperature; dissolving such a polymer in a solvent therefor to form a film-forming solution; molding such a polymer; using such a polymer of low molecular weight as an emulsifier or as a detergent, etc. Other aspects of the invention are evident upon a study of this disclosure and the appended claims.

According to the invention, as set forth, described and claimed in said Serial No. 412,643, it has been found that an alpha-chloroalkyl chlorosulfate can be prepared by treating a 1,1-dichloroalkane with sulfur trioxide. Further according to the said invention of said application, it has been found that an alpha-chloroalkyl chlorosulfate can be converted to an alkene sulfuric acid by contacting it with water.

According to the presently claimed invention, it has been found that an alkene sulfuric acid can be caused to polymerize to yield a solid, moldable polymer, soluble in, say, carbon tetrachloride and useful in such solution as a coating material, and a relatively low molecular weight polymer useful as a polymeric emulsifier. Further, it has been found that a relatively low molecular weight polymer, which can be extracted with alkali from the solid moldable polymer, is useful as a detergent or as an emulsifier, for example, in emulsion polymerization systems.

An object of this invention is to provide novel sulfur-containing polymers.

Another object of this invention is to provide a method for the preparation of novel sulfur-containing polymers.

Another object of this invention is to provide novel polymers which are moldable and can be used as coating material.

Yet another object of this invention is to provide a novel emulsifier material useful in acid-side polymerization to produce resinous masses.

Other objects are apparent from this specification and claims.

Also, according to this invention, a polymer of an alkene sulfuric acid of this invention is prepared by heating such an alkene sulfuric acid, preferably dissolved in water, for a time sufficient to form said polymer.

Further, according to this invention, a solid polymer of an alkene sulfuric acid is prepared by heating such an acid for a time sufficient to obtain said polymer.

Also, according to this invention, a coating of a solid polymer of an alkene sulfuric acid is laid down upon a material to be coated by dissolving said polymer in a solvent therefor, applying the solution to said material and then evaporating said solvent from said solution.

Also, according to the invention, there is provided a method for the emulsification of a heterogeneous system which comprises adding to such a system a low molecular weight polymer of an alkene sulfuric acid of the invention obtained by extraction with a suitable solvent such as aqueous alkali metal hydroxide or methanol of a solid polymer of an alkene sulfuric acid of the invention.

The alkene sulfuric acid which is used to prepare the polymers of the invention is prepared as follows.

A reaction between a dichloroalkene and sulfur trioxide to form an alpha-chloroalkyl chlorosulfate is effected at a low or at an ordinary temperature, preferably below, say, 25° C., still more preferably in the range minus 20° C. to 20° C. A range of minus 5° C. to 5° C. is quite satisfactory. The sulfur trixodie employed can be either gaseous or liquid and ordinarily is added in a mol ratio to the dichloroalkane, say, dichloroethane, of from 0.5:1 to 5.0:1, preferably 1:1 to 2:1. The reaction is self-starting, the sulfur trioxide is passed into the liquid dichloroalkane contained in a suitable vessel which can be cooled by placing it in crushed ice. Care is to be taken, when passing the sulfur trioxide into the dichloroalkane, that the temperature does not rise excessively. The reaction will proceed smoothly. The reaction can be conducted at atmospheric pressure and, therefore, no pressure vessel is required. The reaction of the alpha-chloroalkyl chlorosulfate with water, set out below, is strongly exothermic, and, therefore, this should be carried out under carefully controlled conditions. The alpha-chloroalkyl chlorosulfate can be separated from the reaction mass by pouring said mass onto crushed ice to obtain an oily layer containing the same as set forth more fully herein. The alpha-chloroalkyl chlorosulfate layer need not be separated from the water when the alkene sulfuric acid is desired to be prepared. Thus, the reaction mass of water, ice and oily layer can be heated to a temperature in the range of from about 10° C. to about 100° C., preferably 50° C. to 80° C., say, 75° C. to cause formation of the alkene sulfuric acid which can be obtained from the reaction mass by extraction with a solvent such as diethyl ether or any suitable means. Polymerization of the alkene sulfuric acid, which is also an exothermic reaction, occurs at higher temperatures in the broad range set forth and for this reason for highest yields of the monomeric acid it is now preferred to employ lower temperatures in said range.

The preparation of the polymers of the alkene sulfuric acids of this invention can be accomplished quite readily in water solution. Thus, the acid, dissolved in water, is heated until polymerization is initiated. The temperature at which polymerization will begin can be determined by mere routine test. Usually, the temperature will be above room temperature, in water solution, and will be at least about 175° F. to 200° F. (80° C.–90° C.). Nearer the boiling temperature of water, say, 200° F., polymerization will take place rapidly. Vinyl sulfuric acid, for example, was polymerized in water solution at an initial temperature of about 175° F. and with rise of the temperature the rate of polymerization increased until at or near the boiling temperature of water polymerization proceeded quite rapidly.

In the two-step preparation of the alkene sulfuric acid which is polymerized according to this invention there is first formed, as stated, an alpha-chloroalkyl chlorosulfate by reaction of anhydrous sulfur trioxide and an anhydrous 1,1-dichloroalkane, as illustrated by the following equation

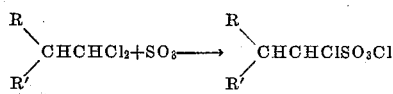

wherein R and R' can be hydrogen or an alkyl group, R and R' can be identical or different and wherein the carbon atoms in R and R' total not more than twenty. For example, the alkyl group or groups may be selected from ethyl, n-propyl, isopropyl, isobutyl, tertiary butyl, etc. groups. Also, the 1,1-dichloroalkanes used in the process of the invention can be represented by the formula

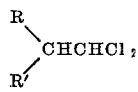

wherein R and R' are as before stated herein. Therefore, the formation of the alkene sulfuric acids prepared according to the invention can be represented by the equation

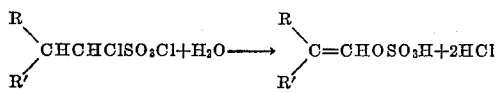

wherein R and R' are as before stated herein.

The alkene sulfuric acids used in this invention are characterized at least by an alpha double bond, as shown.

The polymers of the alkene sulfuric acids of my invention have a structural formula which can be represented as follows:

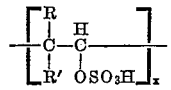

wherein R and R' are as defined above and wherein $x$ is a whole number which can be in the range of 5 to 50 and more generally in the range of 2 to 500 or even higher. The formula for polyvinyl sulfuric acid can be represented as follows:

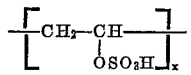

where $x$ is as defined above.

By hydrolysis of this acidic polymer a polymer containing hydroxyl groups can be obtained as represented by the following formula:

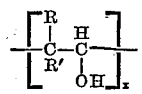

wherein R, R' and $x$ are as defined above. For example, when the polymer of vinyl sulfuric acid is hydrolyzed polyvinyl alcohol is obtained. This material has many uses in the resin and plastic fields as known to those skilled in the art, i.e., as a component in protective coatings, as a film-forming material, in the preparation of hydrocarbon-resistant products, such as tubing, and the like.

Vinyl sulfuric acid can also be polymerized in the presence of ultraviolet light. At room temperature vinyl sulfuric acid polymerizes to a solid, water-insoluble polymer, but, of course, the rate is considerably lower than it is at the higher temperature mentioned above. Certain catalysts have a promoting effect on this polymerization reaction.

The following examples are illustrative of the several aspects of the invention. Reading the examples, one skilled in the art should consider the following:

The alkene sulfuric acids and particularly vinyl sulfuric acid can be homopolymerized to provide resinous high molecular weight polymers containing acidic groups. These polymers can be treated to replace the acidic groups with hydroxyl groups by hydrolysis. They can be copolymerized, according to known methods, with other polymerizable monomeric materials such as butadiene, styrene, acrylonitrile, ethyl acrylate, and vinyl chloride to produce resinous or rubber-like copolymers. These copolymers will contain an acidic group which, if desired, can be replaced by a hydroxyl group by hydrolysis. Thus, a novel method of producing polymers containing hydroxyl groups is also provided as a feature of this invention.

*Example 1*

250 grams of ethylidene chloride (1,1-dichloroethane) was charged to a 3-necked flask fitted with a Dry Ice-acetone cooled condenser attached to a sulfuric acid trap, a stirrer, thermometer, and dropping funnel. To the ethylidene chloride was added drop-wise with stirring, 237.5 grams of sulfur trioxide (Sulfan-B), the mixture being maintained at a temperature below 30° F. (—1.1° C.) at all times by suitable cooling means. The addition of sulfur trioxide required a total of about 30 minutes at which time the reaction mixture was a light colored liquid. Stirring was continued at low temperature for one hour to ensure complete reaction.

Contents of the flask was poured over about two liters of shaved ice to remove unreacted sulfur trioxide and effect some hydrolysis. Considerable heat was evolved as evidenced by melting of most of the ice. The hydrolysis mixture formed two phases, an oil layer and a supernatant aqueous layer.

The oil layer, identified in a previous series of experiments as $CH_3CHClOSO_3Cl$ was recovered and washed with ice water until essentially free of sulfate ion. It was then dissolved in cold ether and again washed with ice water. The washed ether solution was placed in an equal volume of distilled water and the temperature of the two-phase mass thus obtained allowed to rise. At or somewhat below room temperature, hydrolysis of the alpha-chloroalkane chlorosulfate proceeded with considerable evolution of heat. Cooling of the flask was effected, thus preventing overheating during the evolution of said heat. The hydrolysis product, which was vinyl sulfuric acid, dissolved in the water as said product was formed. The temperature was elevated to the boiling point and boiling continued for some time without external heating, indicating that further reaction was taking place. A considerable amount of polymer had formed in the flask at the end of this time. Samples of the above-mentioned aqueous solution, formed by solution of the vinyl sulfuric acid in the water phase as it was formed, were removed and found to be very strongly acid in reaction. When added to a solution of potassium permanganate, the acid removed its color.

The aqueous solution containing the polymer was cooled and extracted six times with ether. The combined extracts were placed in an evaporating dish and the ether evaporated by a stream of air directed on the surface of the liquid. The residual product, after removal of the ether consisted of a solid polymeric material and an oily liquid. The liquid was removed by decantation. It was found that the solid product was insoluble in methyl alcohol and aqueous sodium hydroxide (pH 10). The oily liquid was soluble in both of these materials.

The oily phase decanted from the solid polymer was principally unpolymerized acid containing as a minor ingredient, low molecular weight polymers of vinyl sulfuric acid.

Infrared analysis of a portion of the alkali-washed solid polymer indicated the presence of the following groups: OH, CH, and $RSO_4H$.

The intrinsic viscosity of this polymer was determined in carbon tetrachloride at 30° C. and was found to be 0.03. The molecular weight of this polymer was calculated to be in the range 1000 to 5000.

Example II

A portion of the solid polymer was warmed to 150° F. (65.4° C.) in water, formed into a shape and cooled to room temperature to provide a solid specimen. This test was repeated, heating the polymer on a hot plate.

The solid material is insoluble in dilute alkali, methanol, and water and soluble in carbon tetrachloride, carbon disulfide, benzene, and ether.

Example III

A film was cast on a glass plate, using a solution of the polymer in carbon tetrachloride. This film adhered tenaciously to the glass plate, had a Sward hardness of 46, pencil hardness of 5, and showed a high gloss.

Example IV

A portion of the oily liquid, obtained in Example I, principally vinyl sulfuric acid, but containing some polymeric material, was decanted from the solid product and was tested as an additive for an 88–12 butadiene-vinyl pyridine rubber. To 100 parts of the rubber was added 20 parts of the liquid acid product drop-wise on a warm mill (100° F., 37.8° C.), requiring about 15 minutes, for the addition. The rubber was then removed from the mill, placed in a slab mold and heated for about 5 minutes at 307° F. (152.8° C.) and allowed to cool. Test data on this rubber and an untreated control of the same rubber are as follows:

| | | Treated | Control |
|---|---|---|---|
| Tensile | p.s.i. | 461 | 88.5 |
| Elongation | percent | 525 | 1,040 |
| Shore Hardness [$A_1$] | | 46–49 | 26 |

The reaction of the vinyl sulfuric acid in the foregoing rubber additive test was unique in the sense that, although an acid salt of the pyridine nucleus was formed, it is different from those heretofore observed. Thus, while with mineral acid (i.e., hydrochloric or sulfuric acid) agents, the rubber sets up on the mill to a hard, unprocessible mass, in the foregoing test the rubber was easily milled and later satisfactorily molded to obtain a useful product. Also, had an organic quaternizing agent (i.e., an alkyl halide) been used, its full effectiveness would not have been realized, ordinarily, for at least several hours.

A specimen of the rubber containing the vinyl sulfuric acid treating agent was heated, without significant change in its properties, in a mold at 307° F. (152.8° C.) for five hours. Test data on the heated sample were: tensile, 337 p.s.i.; elongation, 597.

Example V

Low molecular weight polymer, obtained by extracting a portion of the solid polymer by washing with alkali, was studied for surface tension properties. The aqueous alkali solution (pH 10) was found to contain 15 percent solids and from it solutions containing 7.5 and 3.75 percent solids were prepared. Surface tension data on these solutions were as follows:

| Percent solids: | Surface [1] tension |
|---|---|
| 15.00 | 45.6 |
| 7.50 | 47.3 |
| 3.75 | 66.0 |
| Controls: | |
| Water | 72.2 |
| NaOH Solution, pH 10 | 72.2 |

[1] All values taken at room temperature (23° C.).

These data show that this material is effective as a polymeric emulsifier, and, therefore, useful for many applications, particularly, in preparation of resinous polymers.

Example VI

A sample of vinyl sulfuric acid in aqueous solution was exposed to ultraviolet radiation at 158° F. for eight hours at which time polymer formation was evident. Exposure was continued for about 100 hours at which time extensive polymerization had occurred.

Example VII

A water solution of vinyl sulfuric acid similar to that of Example VI except that Maprofix (sodium lauryl sulfate) was added in the proportion of two grams per 100 ml. acid solution was heated in the absence of ultraviolet light at 175° F. on a water bath. Polymerization of the vinyl sulfuric acid had occurred at the end of eight hours.

The foregoing examples, as stated, are illustrative of the several aspects of the invention. Polymeric materials derived from other chlorosulfates and corresponding sulfuric acids are intended to be included. For example, polymers of propene sulfuric acid, 1-butene sulfuric acid and 2-methylpropene sulfuric acid, etc., are included within the scope of the invention. The polymers and other products resulting from the alkene sulfuric acids of this invention, which correspond to those set forth and described herein, are also intended to be included within the scope of the invention as set forth and claimed.

Reasonable variation and modification are possible within the scope of the foregoing disclosure and the appended claims to the invention, the essence of which is that a polymer of an alkene sulfuric acid, a method of polymerization employing such an acid, and a hydroxyl-group-containing copolymer of such an acid with other monomeric materials have been set forth and described as well as that methods for the preparation of the described materials have been set forth and described.

I claim:

1. A homopolymer formed by polymerizing ethylene sulfuric acid, said acid having the formula $$CH_2=CHOSO_3H$$

2. A solid homopolymer formed by polymerizing ethylene sulfuric acid ($CH_2=CHOSO_3H$).

3. A film-forming solution of a solid homoploymer of ethylene sulfuric acid ($CH_2=CHOSO_3H$) dissolved in an organic solvent for said polymer.

4. An alkaline aqueous solution of a low molecular weight homopolymer of ethylene sulfuric acid $$(CH_2=CHOSO_3H)$$

having a pH of about 10 and obtained by extracting a solid polymer of said acid with an aqueous alkali metal hydroxide having a pH sufficient to produce said solution.

5. A homopolymer formed by polymerizing ethylene sulfuric acid ($CH_2=CHOSO_3H$), said homopolymer having structural units as follows:

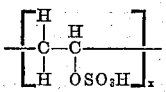

wherein $x$ is a whole number in the range 2-500.

6. A method of preparing a homopolymer of ethylene sulfuric acid which comprises dissolving said acid in water and heating the resulting solution to its boiling point until polymerization to a reaction mass which contains solid polymer has occurred.

References Cited in the file of this patent

UNITED STATES PATENTS 2,395,347   Sharkey _____ Feb. 19, 1946

OTHER REFERENCES

Cahours, Ann. der Chemie and Pharmacie 102, 285–293 (1857).